United States Patent
Van Seumeren

(10) Patent No.: US 6,855,894 B1
(45) Date of Patent: Feb. 15, 2005

(54) MOBILE LIFTING DEVICE AND WEIGHING DEVICE THEREFOR

(75) Inventor: Henri Peter Maria Van Seumeren, Rossum (NL)

(73) Assignee: Ravas Europe B.V. (NL)

( * ) Notice: Subject to any disclaimer, the term of this patent is extended or adjusted under 35 U.S.C. 154(b) by 23 days.

(21) Appl. No.: 10/030,831

(22) PCT Filed: Jul. 12, 2000

(86) PCT No.: PCT/NL00/00489

§ 371 (c)(1),
(2), (4) Date: Apr. 29, 2002

(87) PCT Pub. No.: WO01/03990

PCT Pub. Date: Jan. 18, 2001

(30) Foreign Application Priority Data

Jul. 12, 1999 (NL) .............................................. 1012571

(51) Int. Cl.[7] .............................................. G01G 19/08
(52) U.S. Cl. ........................ 177/130; 177/139; 177/140
(58) Field of Search ................................. 177/130, 140, 177/173, 177, 211, 139

(56) References Cited

U.S. PATENT DOCUMENTS

| | | | | |
|---|---|---|---|---|
| 3,190,363 A | * | 6/1965 | Airesman ..................... 172/44 |
| 4,421,186 A | * | 12/1983 | Bradley ...................... 177/139 |
| 4,666,004 A | * | 5/1987 | Raz ............................ 177/139 |
| 4,899,840 A | * | 2/1990 | Boubille ..................... 177/139 |
| 5,417,536 A | * | 5/1995 | Cech ........................... 414/21 |
| 5,837,946 A | * | 11/1998 | Johnson et al. ............. 177/136 |
| 5,990,423 A | * | 11/1999 | Ashpes et al. .............. 177/140 |
| 6,410,863 B1 | * | 6/2002 | Cappiello ................ 177/25.13 |

FOREIGN PATENT DOCUMENTS

| | | |
|---|---|---|
| EP | 803717 A * | 10/1997 |
| FR | 2752298 A * | 2/1998 |
| WO | WO 8202024 A | 6/1982 |
| WO | WO 9108977 A | 6/1991 |

* cited by examiner

Primary Examiner—Randy W. Gibson
(74) Attorney, Agent, or Firm—McDonnell Boehnen; Hulbert & Berghoff LLP

(57) ABSTRACT

A mobile lifting device comprises a mobile frame (1, 12, 13) with a set of lift forks (3) for receiving a pallet thereon. The pallet truck is provided with a weighing device which comprises at least one pressure or strain-sensitive sensor (20) in addition to a display panel (21) for indicating thereon a value measured by the sensor. The sensor is connected firmly to a pan (12) of the frame and able to determine a mechanical deformation in that part of the frame. The weighing device comprises this sensor.

11 Claims, 2 Drawing Sheets

MOBILE LIFTING DEVICE AND WEIGHING DEVICE THEREFOR

The present invention relates to a mobile lifting device comprising a mobile frame with a lifting device for receiving a cargo thereon which is provided with a weighing device with a display panel for displaying a determined weight of the cargo.

Mobile lifting devices, and in particular pallet trucks, are used on a large scale in distribution centres, storage warehouses and other places where articles or bulk goods are presented and processed on pallets. A pallet truck normally comprises a mobile frame with a lifting device provided with a set of lift forks which can access a pallet. The lift forks are herein usually adapted to a so-called Euro-pallet, this being the most common here in this country. The mobile lifting device is driven with the Lift forks into the pallet, whereafter the lifting device is set into operation to raise to a greater or lesser extent the lift forks with the pallet thereon. As soon as the pallet is clear of the ground, the whole can be moved to carry the pallet to another location. It is noted here that where pallets are mentioned in the present application, this is understood to mean in principle all occurring types and sizes of pallet, including optionally collapsible pallet boxes and other pallet constructions provided with a superstructure.

In some cases it is desirable to have an indication of the number of articles or the mass of bulk material in the cargo of the mobile lifting device. With a view hereto, pallet trucks have been developed which have available a built-in weighing device. In an existing pallet truck the weighing device comprises four load sensors, usually designated as "load cells", which are arranged in the outer ends of the lift forks and are sensitive to a pressure load exerted thereon. These are specially designed elements compensated for numerous ambient factors and having extremely high precision. The total load on the four load sensors ultimately gives an exceptionally accurate measure for the total weight of the cargo on the lift forks which, in the case of a measured weight of typically 0–2000 kg, can in practice be accurate to within between about 100 and 200 g.

A drawback to the above stated existing pallet truck with a weighing device is that the four load sensors applied therein, together with the electronics connected thereto, are relatively costly, which has a cost-increasing effect on the total cost-price of the finished product. More importantly however, a mobile lifting device must undergo a relatively drastic conversion to accommodate the four load sensors therein, which is time-consuming and therefore results in a considerable increase in the cost-price of the mobile lifting device. Alternatives have therefore been suggested wherein only one load sensor is applied instead of four or wherein in the lifting device the lifting power exerted thereby is used as measure for the weight of the cargo on the lift forks. In both cases the point where weighing takes place is shifted from the lift forks to a part of the construction located further away, so that only one sensor is necessary.

An example of such a known device is known from the French patent application no. 2.752.298. This relates to a pallet truck with a set of lift forks. The pallet truck consists roughly of two parts, wherein a first part is provided with a hydraulic cylinder with an optionally manual operation and a second part which comprises the lift forks and which can be lifted to the desired height with the hydraulic cylinder. Both parts are herein mutually connected by a pivoting construction. The lifting movement of the hydraulic cylinder is transmitted to the second part of the mobile lifting device by means of a bridge. In this known device the original bridge of the mobile lifting device is replaced by a load sensor, a so-called load cell, so that the load on the lift forks can be determined thereby and can be generated on a display panel arranged elsewhere on the mobile lifting device as a relatively precise measure for the weight of the cargo.

Known devices of the type stated in the preamble are also described in international patent applications WO 82/02024 and WO 91/08977. These also relate to pallet trucks with a lifting device in the form of a set of lift forks which can be raised to a desired height with a hydraulic cylinder. In both cases a load sensor is placed directly between an end of the piston rod of the cylinder and a fixed part of the truck construction. The lifting pressure exerted by the cylinder can thus be measured with the load sensor and used as measure for the load on the lift forks.

A drawback of all these known constructions however is that in all cases there has to be rather drastic intervention in the original construction of the mobile lifting device. In the latter discussed device the mobile lifting device has to be broken off at the position of the end of the piston rod and a load sensor then added. In the pallet truck of the French patent application even an original part of the mobile lifting device is wholly removed and replaced by a load sensor. Not only does this entail a considerable amount of work, it can also result in some cases in legal problems in respect of liability for the quality of the construction of the mobile lifting device. Furthermore, despite the use of a relatively expensive and per se extremely accurate load sensor, these known pallet trucks are nevertheless found to have a significant lack of precision, which in practice remains limited to about 5–25 kg for a measured weight of 0–2000 kg.

The present invention has among its objects to provide a mobile lifting device of the type stated in the preamble which to at least a significant extent obviates the above stated drawbacks of the known weighing lifting devices.

In order to achieve the stated objective, a mobile lifting device of the type stated in the preamble has the feature according to the invention that the weighing device comprises a pressure or strain-sensitive sensor which is connected firmly to an existing part of the frame and is able to determine a mechanical deformation in that part of the frame and generate this as electronic signal. The invention is herein based inter alia on the insight that a load on the lifting device will result in a mechanical play of forces in the construction of the mobile lifting device and that as a result thereof determined structural parts will stretch or, on the contrary, be compressed to a degree which depends on the weight of the load. An indication of the weight of the cargo is obtained by determining this deformation. The pressure or strain-sensitive sensor is capable of such a registration and generates an electronic signal in accordance with the determined deformation. Because the pressure or strain-sensitive sensor can simply be arranged over an existing part of the construction of the mobile lifting device, there need be no or hardly any intervention in the original construction thereof and the labour time required for this purpose is also very limited.

In a preferred embodiment the mobile lifting device according to the invention is characterized in that the lifting device comprises a set of lift forks and that the sensor is arranged on a part of the frame which mutually connects the lift forks. It is thus possible to suffice with only one sensor to determine the weight on both forks, which has a favourable effect on the cost-price of the finished product.

The pressure or strain-sensitive sensor which determines the deformation in the relevant structural part can be arranged per se directly onto the structural part, for instance by being glued thereon. In a preferred embodiment however, the mobile lifting device according to the invention has the feature that the relatively sensitive pressure or strain-sensitive sensor is arranged on a substrate and that the substrate is provided with means for a firm connection to said part of the frame. The sensor is thus more easily manageable and less vulnerable. In a further embodiment of the mobile lifting device according to the invention the actual pressure or strain-sensitive sensor is herein glued to the substrate, while the substrate itself is connected to the frame by means of a manually releasable connection, such as a screw connection. The sensor is thus relatively simple to place but can also be easily replaced in the case of malfunction or damage.

Numerous types of pressure or strain-sensitive sensors can in principle be applied in the mobile lifting device according to the invention. Particularly good results have however been obtained with an embodiment of the mobile lifting device according to the invention wherein the pressure or strain-sensitive sensor comprises a strain gauge which is coupled by electronic means to the display panel. In the relevant range a strain gauge has a more or less linear relation between the thereby determined load and its electrical resistance, whereby as the case arises the sensor can be coupled relatively directly to the display panel without intervention of conversion electronics.

While the precision which can be achieved with the device according to the invention is significantly lower than that of a mobile lifting device provided with four load sensors in the lift forks thereof, it is nevertheless sufficient for many applications and also considerably cheaper to realize. The display panel can be adapted hereto because no numeric designation of apparently high accuracy which greatly exceeds the actual accuracy is per se necessary. It can thus be the case that a numeric display panel accurately displays the weighing result in kilograms, while the measurement accuracy actually amounts to no more than 20–50 kg. In order to avoid this discrepancy, a further preferred embodiment of the mobile lifting device according to the invention has the feature that the display panel is able to give a weight designation in the form of a variable set of discrete indicators, each representing a fixed weight quantity adapted to the measurement accuracy of the weighing device.

A further embodiment of the mobile lifting device according to the invention has the feature that the indicators comprise light-emitting diodes which are coupled to the sensor in an electronic circuit. Such diodes, normally referred to as LEDs, are characterized by a favourable cost-price, a good discernability and a comparatively simple electronic circuitry, whereby they are highly suitable for the display panel of the mobile lifting device according to the invention. LEDs do however have a considerable energy consumption, which in some cases can possibly limit the lifespan of the power supply appreciably. With this in mind, a further embodiment of the mobile lifting device according to the invention is characterized in that the indicators comprise contrasting surfaces in a liquid crystal display panel. Although such a display panel, usually referred to as LCD, requires more complicated circuitry, it generally has an appreciably lower energy consumption than a comparable display panel on the basis of LEDs.

A further particular embodiment of the mobile lifting device according to the invention has the feature that in the display panel at least one zone of indicators is marked as such. This marking can for instance indicate a weight limit or a maximum load of the pallet or pallet truck dictated from the viewpoint of working conditions, so that it is clear at a glance whether this limit has been exceeded.

The sensor of the weighing device in the mobile lifting device according to the invention is preferably arranged not in but, instead, on the construction of the mobile lifting device. The sensor thereby remains directly accessible. A preferred embodiment of the mobile lifting device according to the invention herein has the feature that the display panel is arranged together with possible additional electronics in a housing and that the housing also comprises the sensor and is connected firmly via the sensor to an existing part of the mobile lifting device. This embodiment is here based on the insight that, because according to the invention the sensor is arranged outside on the construction and not in the construction, it is possible to integrate the components of the weighing device in a single housing. Not only does this offer great advantages in respect of the length of time for assembly and possible disassembly of a weighing device on an existing mobile lifting device, it is thus also possible to suffice with relatively simple tools on site.

The weighing device is thus no more than a single additional component which can optionally be mounted later on the mobile lifting device and can as such be marketed separately. The invention therefore also relates to a weighing device for a mobile lifting device comprising a housing provided with a display panel, possible additional electronics, including an electrical power supply, and a pressure or strain-sensitive sensor, which is provided with mounting means for mounting on a structural part via the sensor.

The invention will now be further elucidated with reference to an embodiment and a related drawing. On the drawing.

Corresponding parts are designated in the figures with the same reference numeral and parts are sometimes drawn purely schematically and not to scale. Some dimensions in particular are highly exaggerated in the drawing for the sake of clarity.

Figure 1:
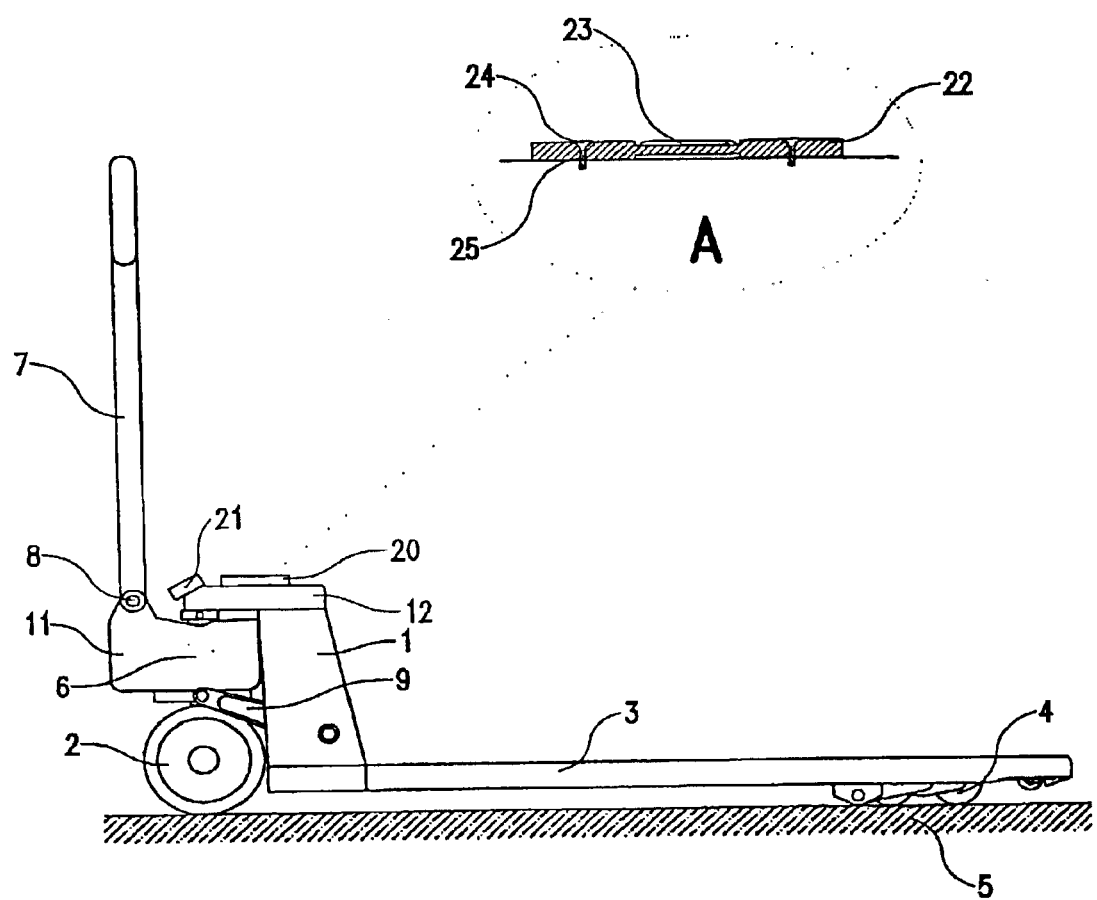
FIG. 1 shows a side view of an embodiment of a mobile lifting device according to the invention.
Figure 2:
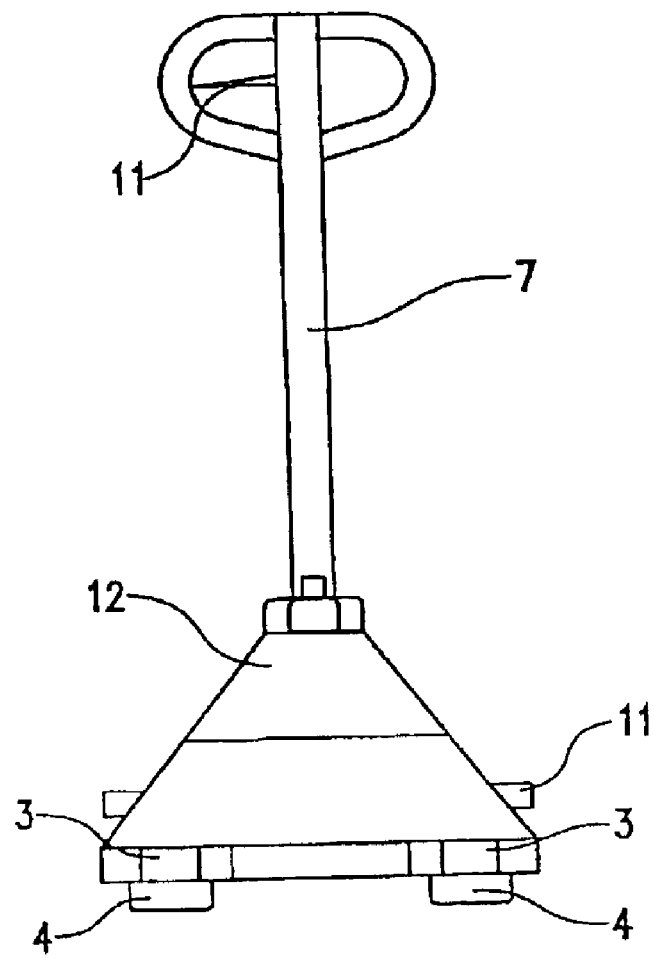
FIG. 2 shows a front view of the mobile lifting device of FIG. 1.

The mobile lifting device of FIG. 1 comprises a so-called pallet truck with a mobile frame 1 which rests on one side on a swivel castor 2 and comprises on the other side a pair of lift forks 3 which support with fixed wheels 4 on the ground 5. Situated above castor 2 is a hydraulic cylinder 6 which forms part of a lifting device of the pallet truck and which is placed between a first frame part 11 and a second fame part 12 of the pallet truck. Cylinder 6 can be operated using a handle 7 of the pallet truck. Handle 7 is mounted pivotally around a pivot shaft 8 and by making an up and downward pumping movement therewith the cylinder 6 is brought to pressure. As a consequence thereof the second frame part 12 is raised relative to first frame part 11 and a possible cargo on lift forks 3 is lifted. This lifting movement is transmitted by means of a set of pull and push rods 9 to lift forks 3 so that they remain horizontal. For this purpose the lift forks 3 can pivot on their ends. As soon as a pallet received by lift forks 3 is clear of the ground 5, the pallet can be moved to the desired location. At the place of destination a lever 11 in the handle 7 is pulled to release the hydraulic pressure from cylinder 6, whereby the lift forks will descend and the cargo can be set down. The pallet truck of this embodiment is pulled manually by handle 3. It is however also possible to equip the pallet truck with a motor with which castor 2 is driven in order to make moving of the pallet truck easier. The lifting movement can also be motor-driven and optionally continued to greater heights so that pallets can be mutually stacked.

For the purpose of indicating the weight of the cargo on the lift forks, the pallet truck is provided with a weighing device. The weighing device comprises a pressure and strain-sensitive sensor 20, a display panel 21 and an electrical power supply, such as a battery or accumulator, which is arranged close to or in display panel 21 but which is not otherwise shown in the figure. Sensor 20 is shown greatly enlarged in detail view A and comprises a metal substrate 22 on which is glued a pressure and strain-sensitive strain gauge 23. The glueing is such that any deformation of substrate 22 is transmitted at least almost completely to strain gauge 23. Substrate 22 is in turn attached in a manually releasable but nevertheless firm manner to frame 12. Selected for this purpose in this embodiment is a screw connection with screw bolts 24 which fit precisely into bores 25 arranged for this purpose in substrate 22, so that in particular longitudinal forces also occurring in the frame are transmitted at least almost completely to substrate 22. Owing to this construction the sensor is simple to place and, in the case of malfunction or damage, equally simple to replace. Instead of metal a plastic or ceramic can for instance also be applied for the substrate.

Figure 3:
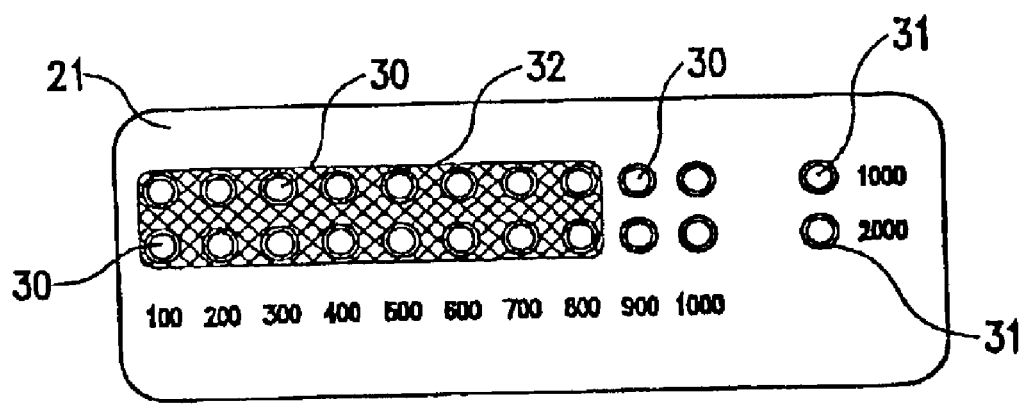
FIG. 3 shows a schematic front view of the display panel of the pallet truck of FIG. 1.

A cargo on the pallet truck will give a load on both lift forks 3 which is transmitted to the part of frame 12 mutually connecting both forks 3. The total load will be applied here and will result in a minimal deformation of the frame which is still large enough however to be determined by the sensor 20 which is arranged over this part of the construction. Sensor 20 translates the mechanical deformation into a resistance change which, at least within the range of operation, is proportional to the degree of deformation and thereby to the weight of the cargo on forks 3. The thus measured weight is visible on the display panel 21 which is shown in enlarged front view in FIG. 3.

Display panel 21 is able to indicate the measured weight in the form of a variable set of discrete indicators, each representing a determined weight quantity. In this embodiment these are discrete light-emitting diodes, so-called LEDs, each representing a weight of 25 kg, this being adapted to the measurement accuracy of the device, which lies typically between 5 and 25 kg. In this embodiment the display panel comprises forty such LEDs 30 in addition to two LEDs 31 which indicate respectively whether 1000 kg and 2000 kg have been exceeded. The upper array of LEDs 30 herein indicates the fifties while the lower array designates full hundreds. A zone of indicators 30 up to a weight of 800 kg is moreover marked by a colour marking 32 so as to indicate exceeding of a standard weight which, from the viewpoint of working conditions, one person is allowed to move. This is therefore visible at a glance on display panel 21. Display panel 21 thus provides information in a particularly clear manner concerning the actual weight of the cargo on lift forks 3.

Although the invention has been further elucidated above with reference to only a single embodiment, it will be apparent that the invention is by no means limited to the given embodiment. On the contrary, numerous variations and embodiments are still possible within the scope of the invention for the person with ordinary skill in the art. The invention has thus been further described with reference to a hand pallet truck, but is equally applicable to motor-driven pallet trucks and other types of mobile lifting devices such as for instance lift trucks.

Instead of a display panel on the basis of discrete LEDs as indicators of the measured weight, it is further possible to apply a liquid crystal display panel (LCD) on which discrete surfaces provide a comparable weight indication. More colours may also be applied in respect of the indicators, for instance to indicate that a determined weight has been exceeded. In addition, it is possible to apply an (alpha) numeric display panel for reading of the determined weight Another element can further be applied instead of a strain gauge to provide an indication of the load in, the frame of the pallet truck, such as for instance a piezoelectric crystal which generates a variable electrical voltage under pressure. In both cases the element can be attached via a substrate or directly to the frame. This latter provides a more compact and perhaps less expensive whole, the former more ease of assembly.

Because the sensor according to the invention is arranged not so much in as on the construction of the mobile lifting device, this provides the option of integrating the sensor together with the display panel and associated electronics, including an electrical power supply, in one and the same housing and to arrange this as assembled separate component on the mobile lifting device.

It is further possible to provide the weighing device with an electronically programmable and readable memory, for instance a (Flash) EEPROM, and to store therein at least a number of calibration points which indicate a relation between an output signal of the sensor and an actual weight on the lifting device. If the precision of the weighing device decreases in the long term as a consequence of deformations in the construction of the mobile lifting device, these calibration values can simply be redefined at a later stage so as to thus at least significantly restore the precision of the device. For this purpose the weighing device is preferably equipped with means to (re)write the memory, which can optionally be performed by the (end) user himself. The precision of the device can thus be ensured over a long period.

On the basis of the foregoing it will be apparent that the invention provides a mobile lifting device with a weighing device which in practice offers sufficient precision in many cases but which is nevertheless exceptionally simple to arrange without having to intervene in the existing original construction of the mobile lifting device. In particular the whole weighing device can herein be integrated into one compact whole in a common housing which can be marketed separately, and which gives an existing mobile lifting device weighing functionality solely by mounting thereof.

What is claimed is:

1. Mobile lifting device comprising a mobile frame with a lifting mechanism for receiving and lifting a cargo thereon, the mobile lifting device further comprising a weighing device, wherein the weighing devices comprises a pressure or strain sensitive sensor and a display panel coupled to the sensor for recording and displaying a weight of the cargo, wherein the weighing device is assembled additionally to the frame, wherein the sensor is mounted to and is parallel over a part of the frame that is prone to mechanical deformation caused by the weight of the cargo, wherein the sensor does not bear the entire weight of the cargo but rather measures an indirect force of the cargo resulting from the mechanical deformation, and wherein the sensor records the deformation and generates it as an electronic signal.

2. Mobile lifting device as claimed in claim 1, wherein the lifting device comprises a set of lift forks and that the sensor is arranged on a part of the frame which mutually connects the lift forks.

3. Mobile lifting device as claimed in claim 1 wherein the sensor is arranged on a substrate and that the substrate is provided with means for a firm connection to said part of the frame.

4. Mobile lifting device as claimed in claim 3, wherein the sensor is glued to the substrate and that the substrate is connected to the frame by means of a manually releasable connection.

5. Mobile lifting device as claimed in claim 1, wherein the sensor comprises a strain gauge which is coupled by electronic means to the display panel.

6. Mobile lifting device as claimed in claim 1, wherein the display panel is able to give a weight designation in the form of a variable set of discrete indicators, each representing a fixed weight quantity adapted to the measurement accuracy of the weighing device.

7. Mobile lifting device as claimed in claim 6, wherein the indicators comprise light-emitting diodes which are coupled to the sensor in an electronic circuit.

8. Mobile lifting device as claimed in claim 6, wherein the indicators comprise contrasting surfaces in a liquid crystal display panel.

9. Mobile lifting device as claimed in claim 6, wherein in the display panel as least one zone of indicators is marked as such.

10. Mobile lifting device as claimed in claim 1, wherein the display panel is arranged in a housing and that the housing also comprises the sensor and is connected firmly via the sensor to an existing part of the mobile lifting device.

11. Mobile lifting device as claimed in claim 1, further comprising a single housing for holding the weighing device and a power supply for the weighing device, and wherein the single housing is provided with a manual release mechanism for releasing the single housing from the frame.

* * * * *